(12) United States Patent
Bouknight et al.

(10) Patent No.: US 8,578,030 B2
(45) Date of Patent: Nov. 5, 2013

(54) AUTONOMIC ASSIGNMENT OF COMMUNICATION BUFFERS BY AGGREGATING SYSTEM PROFILES

(71) Applicant: International Business Machines Corporation, Armonk, NY (US)

(72) Inventors: Wendell J. Bouknight, Raleigh, NC (US); David B. Gilgen, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/764,728

(22) Filed: Feb. 11, 2013

(65) Prior Publication Data

US 2013/0151740 A1     Jun. 13, 2013

Related U.S. Application Data

(62) Division of application No. 10/716,688, filed on Nov. 19, 2003, now Pat. No. 8,423,643.

(51) Int. Cl.
*G06F 15/173* (2006.01)

(52) U.S. Cl.
USPC .................................... 709/226; 709/224

(58) Field of Classification Search
USPC .................................. 709/224, 226
See application file for complete search history.

(56) References Cited

U.S. PATENT DOCUMENTS

| 4,603,382 | A | * | 7/1986 | Cole et al. ................. 710/56 |
| 5,289,470 | A | * | 2/1994 | Chang et al. ............... 711/173 |
| 5,333,269 | A | * | 7/1994 | Calvignac et al. .......... 709/215 |
| 5,339,413 | A | * | 8/1994 | Koval et al. ................. 719/314 |
| 5,751,969 | A | * | 5/1998 | Kapoor ....................... 709/235 |
| 5,797,042 | A | * | 8/1998 | Gaylord ...................... 710/56 |
| 5,903,735 | A | * | 5/1999 | Kidder et al. .............. 709/240 |
| 5,913,041 | A | * | 6/1999 | Ramanathan et al. ..... 709/233 |
| 6,092,113 | A | * | 7/2000 | Maeshima et al. ........ 709/230 |
| 6,105,070 | A | * | 8/2000 | Gaylord ...................... 709/232 |
| 6,385,673 | B1 | * | 5/2002 | DeMoney ................... 710/60 |
| 6,389,468 | B1 | * | 5/2002 | Muller et al. .............. 709/226 |
| 6,397,274 | B1 | * | 5/2002 | Miller ......................... 710/56 |
| 6,404,770 | B1 | * | 6/2002 | Fujimori et al. ........... 370/429 |
| 6,535,929 | B1 | * | 3/2003 | Provino et al. ............. 719/321 |
| 6,538,990 | B1 | * | 3/2003 | Prorock ...................... 370/229 |
| 6,820,129 | B1 | * | 11/2004 | Courey, Jr. ................. 709/234 |
| 6,836,785 | B1 | * | 12/2004 | Bakshi et al. ............... 709/203 |
| 6,842,800 | B2 | * | 1/2005 | Dupont ....................... 710/52 |
| 6,918,067 | B2 | * | 7/2005 | Bartucca et al. ............ 714/47.2 |
| 6,970,426 | B1 | * | 11/2005 | Haddock ..................... 370/235.1 |
| 6,983,462 | B2 | * | 1/2006 | Savov et al. ................ 718/104 |

(Continued)

*Primary Examiner* — Brian P Whipple
(74) *Attorney, Agent, or Firm* — Steven M. Greenberg, Esq.; Carey, Rodriguez, Greenberg & O'Keefe

(57) ABSTRACT

A method, system and apparatus for autonomic buffer configuration. In accordance with the present invention, an autonomic buffer configuration method can include monitoring data flowing through buffers in a communications system and recording in at least one buffer profile different data sizes for different ones of the data flowing through the buffers during an established interval of time. An optimal buffer size can be computed based upon a specification of a required percentage of times a buffer must be able to accommodate data of a particular size. Subsequently, at least one of the buffers can be re-sized without re-initializing the at least one resized buffer.

8 Claims, 2 Drawing Sheets

(56) References Cited

U.S. PATENT DOCUMENTS

| | | | |
|---|---|---|---|
| 7,080,163 B2 * | 7/2006 | Aiken et al. | 709/250 |
| 7,120,751 B1 * | 10/2006 | Endo et al. | 711/134 |
| 7,149,664 B1 * | 12/2006 | Firoiu et al. | 703/2 |
| 7,191,229 B2 * | 3/2007 | Edmondson | 709/224 |
| 7,389,318 B2 * | 6/2008 | Yoshida et al. | 709/200 |
| 8,107,744 B2 * | 1/2012 | Tian et al. | 382/233 |
| 2002/0194338 A1 * | 12/2002 | Elving | 709/226 |
| 2004/0010612 A1 * | 1/2004 | Pandya | 709/230 |

* cited by examiner

AUTONOMIC ASSIGNMENT OF COMMUNICATION BUFFERS BY AGGREGATING SYSTEM PROFILES

This application is a Divisional of U.S. application Ser. No. 10/716,688, filed on Nov. 19, 2003, entitled "AUTONOMIC ASSIGNMENT OF COMMUNICATION BUFFERS BY AGGREGATING SYSTEM PROFILES," the entirety of which is incorporated herein by reference.

BACKGROUND OF THE INVENTION

1. Statement of the Technical Field

The present invention relates to server performance tuning and more particularly to configuring buffers for optimal server performance.

2. Description of the Related Art

To obtain optimal performance from a network-based server, the server can be fine-tuned for its specific application environment. In the context of the Internet, application environments associated with Web serving include high-performance Web serving, multi-hosting and benchmarking. In the high-performance Web serving environment, the tuning process can focus upon content served in the environment and the anticipated load of a specific Web site hosted in the Web serving environment. By comparison, in the multi-hosting environment, performance tuning can account for the effect of a single server hosting multiple Web sites as is the case typically with an Internet service provider (ISP). Finally, in the benchmarking environment, performance tuning can relate directly to the achievement of the highest performance for a specific set of tests.

For almost any server that provides a network-based service such as a Web server configured for use with the hypertext transfer protocol (HTTP), four basic server components form the foundation of server performance: Processor, Memory, Network and Disk. Basic HTTP serving involving mere static text and images does not consume much processor resources, however, as dynamic elements are added to the Web site, processor performance can become increasingly more of an important factor to be considered. Tuning the processor component typically can involve the optimization of the hosted application, the use of a faster processor, or the augmentation of the number of processors accessible by the server.

Deficiencies within the network component often causes the greatest performance bottlenecks experienced in the server environment. These bottlenecks can occur in direct consequence of the fixed communications bandwidth often afforded to the network interface of the server. In contrast, most recently the disk component has grown to be a de minimus factor of the four components. In this regard, excepting for disk intensive and input/output (I/O) intensive applications hosted within the server, the disk resource often has a negligible impact upon the performance of a server. In the circumstance where the disk resource can have a more substantial impact, tuning techniques such as disk striping can be used to improve I/O and consequently server performance.

By far, memory utilization represents the single most tunable variable of the four performance factors. Memory is vital to server performance and, in the absence of sufficient memory and in the presence of improper tuning, a server can resort to virtual page swapping. As it will be recognized by the skilled artisan, virtual page swapping can impart a tremendous impact upon the performance of an application hosted within a server. Ideally, a server such as a Web server or application server will include enough memory to handle all necessary applications, network buffers, and a performance oriented cache. In this regard, when most or all content hosted within a content server can be cached in an I/O buffer cache rather than remaining on disk, server performance can be enhanced substantially.

For performance critical applications, the ability to serve a range of clients, from one million to ten million, solely rests with how well a communications system can efficiently handle the requested and respondent I/O operations. Generally, in order to speed processing of requests and responses a server can push requests and responses into kernel-level and application-level buffers to allow processing of additional requests and responses. Thus, optimal performance can be obtained by controlling the size and number of network buffers available for use by the communication system of the server.

When sizing buffers, however, it is important to recognize that when a process sends or receives a quantity of data which is larger than an available buffer, the process can push out a buffer-sized chunk first. Subsequently, the process can wait until the data in the buffer has drained before sending the next chunk. Importantly, the process cannot handle another request or response until the last chunk of data has been sent to the buffer. Accordingly, buffers ought to be sized large enough to that server processes need not spend time unnecessarily breaking off chunks of data to send to buffers. Conversely, clients often drop connections with servers leaving large amounts of data in buffers waiting to be drained. Data which never drains from a buffer can be a burden until cleared. Accordingly, buffers ought not be sized too large.

Presently, buffers are sized statically by design. In this regard, the size of kernel-level and application-level buffers can be sized independently of one another and can be "hard-coded" in a configuration repository such as a flat file or a registry. User-level and system-oriented applications traditionally key-off these stored values during initialization as static determinations for the size of newly allocated buffers. Significantly, these values for the size of buffers cannot change dynamically causing significant performance deficiencies arising from environmental changes not present when computing the static determination of buffer size.

The static establishment of buffer size stands in stark contrast to present trends in computing—in particular autonomic computing. In the famed manifesto, Autonomic Computing: IBM's Perspective on the State of Information Technology, Paul Horn, Senior Vice President of IBM Research, observed, "It's not about keeping pace with Moore's Law, but rather dealing with the consequences of its decades-long reign." Given this observation, Horn suggested a computing parallel to the autonomic nervous system of the biological sciences. Namely, whereas the autonomic nervous system of a human being monitors, regulates, repairs and responds to changing conditions without any conscious effort on the part of the human being, in an autonomic computing system, the system must self-regulate, self-repair and respond to changing conditions, without requiring any conscious effort on the part of the computing system operator.

Thus, while the autonomic nervous system can relieve the human being from the burden of coping with complexity, so too can an autonomic computing system. Rather, the computing system itself can bear the responsibility of coping with its own complexity. The crux of the IBM manifesto relates to eight principal characteristics of an autonomic computing system:

I. The system must "know itself" and include those system components which also possess a system identify.

II. The system must be able to configure and reconfigure itself under varying and unpredictable conditions.

II. The system must never settle for the status quo and the system must always look for ways to optimize its workings.

IV. The system must be self-healing and capable of recovering from routine and extraordinary events that might cause some of its parts to malfunction.

V. The system must be an expert in self-protection.

VI. The system must know its environment and the context surrounding its activity, and act accordingly.

VII. The system must adhere to open standards.

VIII. The system must anticipate the optimized resources needed while keeping its complexity hidden from the user.

Importantly, performance tuning has yet to be viewed from the perspective of the eight tenants of autonomic computing. In particular, whereas autonomic computing requires the notion of self-configuration, management and healing, the manual static sizing of buffers in a communications system hardly constitutes self-configuration. Similarly, the manual modification of hard code to re-size a buffer again does not reflect self-management and self-healing principles. Yet, these four principles provide for the foundation of autonomic computing. Moreover, self-managing systems which comport with the principles of autonomic computing reduce the cost of owning and operating computing systems. Yet, implementing a purely autonomic system has proven revolutionary. Rather, as best expressed in the IBM Corporation white paper, Autonomic Computing Concepts (IBM Corporation 2001) (hereinafter, the "IBM White Paper"), "Delivering system-wide autonomic environments is an evolutionary process enabled by technology, but it is ultimately implemented by each enterprise through the adoption of these technologies and supporting processes."

SUMMARY OF THE INVENTION

The present invention addresses the deficiencies of the art in respect to optimally configuring buffers for performance tuning a server and provides a novel and non-obvious method, system and apparatus for autonomic buffer configuration. In accordance with the present invention, an autonomic buffer configuration method can include monitoring data flowing through buffers in a communications system and recording in at least one buffer profile different data sizes for different ones of the data flowing through the buffers during an established interval of time. An optimal buffer size can be computed based upon a specification of a required percentage of times a buffer must be able to accommodate data of a particular size. Subsequently, at least one of the buffers can be re-sized without re-initializing the at least one resized buffer.

Optionally, the recording step further can include the step of varying delays between consecutive I/O operations in the communications system to affect how much data flows between the communications system and an application coupled to the communications system. Also, the monitoring step can include the step of monitoring the data for each connection in the communications system. Consequently, the computing step can include the step of computing an optimal buffer size sufficient to maintain long-lived communication. Moreover, a buffer size can be established for newly opened connections in the communications system based upon the computed optimal buffer size.

A profile processor disposed within an autonomic buffer configuration system can include a performance monitor arranged to monitor data flowing through at least one buffer in a communications system. A reporting tool can be configured to generate at least one buffer profile based upon monitored information produced by the performance monitor. A buffer size calculator can be programmed to compute an optimal buffer size for the buffer based upon the buffer profile. Finally, a buffer resizing component can be coupled to the at least one buffer and can be programmed to dynamically resize the buffer to the optimal buffer size without re-initializing the buffer. Notably, the buffer can be an application-level buffer or a kernel-level buffer, though the buffer is not limited strictly to either. Similarly, though the data can include requests and responses to requests, the data is not limited as such. Consequently, the communications system can be disposed within a Web server or a server process.

In a preferred aspect of the invention, the performance monitor can include a configuration for performing an analysis of an amount of data passed between the application-layer buffer and the kernel-layer buffer. Additionally, the performance monitor can include a configuration for performing at least one of (1) a statistical analysis of request sizes for an interval of time for the communications system, (2) a statistical analysis of request sizes for an interval of time for individual connections in the communications system, (3) a statistical analysis of inserting delay durations of varying lengths between consecutive I/O operations in the communications system, and (4) a statistical analysis of patterns of requests and an ordering of the requests in the patterns. In all cases, the monitored information can be weighted in the buffer profile to reflect varying levels of importance for different types of information monitored in the buffers.

Importantly, while the system of the present invention can be configured for operation in the context of a single communications system, the invention is not so limited. Rather, the system of the present invention can be extended to compute optimal buffer sizes based upon information collected through monitoring multiple communications systems. In this regard, a profile aggregator can be configured to combine individual buffer profiles for different communications systems to produce a single profile for use by the calculator in computing an optimal buffer size.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for autonomic buffer configuration. In accordance with the present invention, user-level buffers can be dynamically and automatically sized in real-time by analyzing buffer usage profiles of a particularly system and making respective adjustments. Specifically, a buffer usage profile processor can monitor the usage of the buffers in an out-of-band process. Based upon the data collected during the monitoring phase, a profile can be produced which describes the usage of the buffers. Subsequently, an optimal buffer size can be computed from the profile to ensure that a minimum percentage of requests can be satisfied. Finally, the optimal buffer size can be applied to the buffer in real-time to produce an optimally sized buffer.

Figure 1:
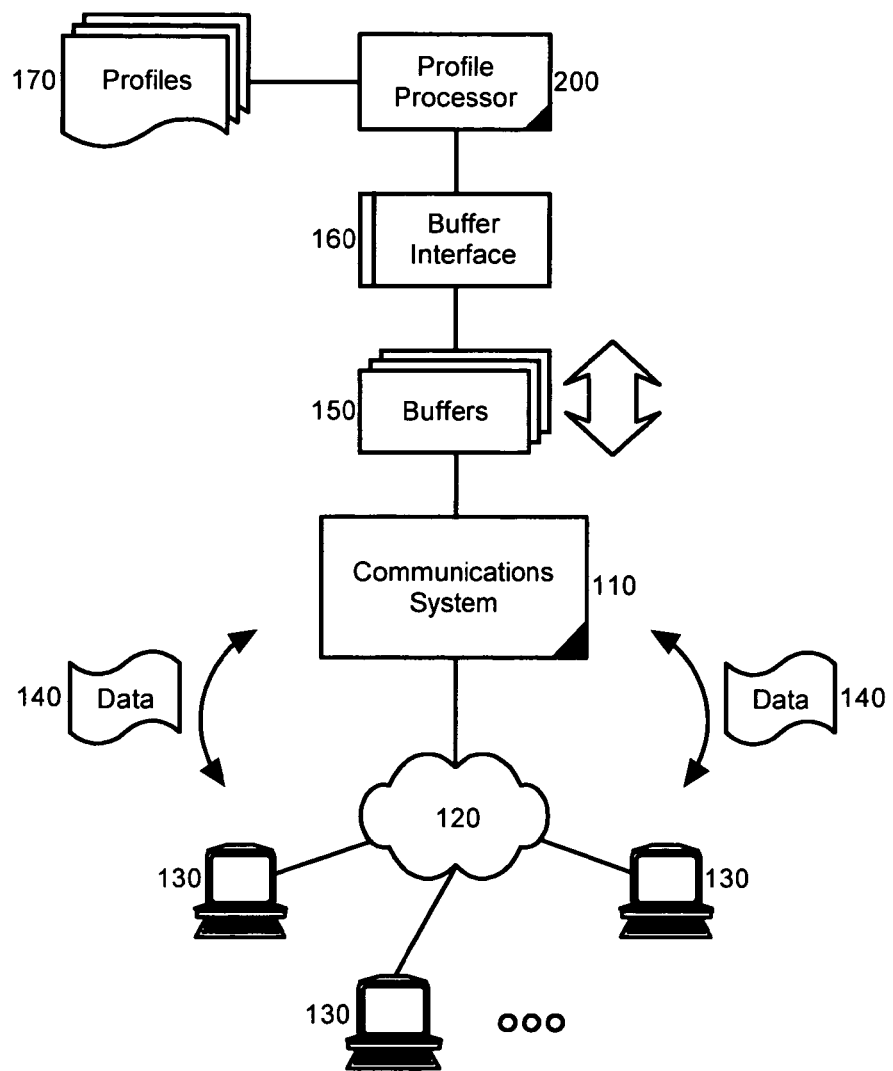
FIG. 1 is a schematic illustration of a system configured for autonomic buffer configuration in accordance with the present invention; and, FIG. 2 is a flow chart illustrating a process for autonomically configuring a buffer in the system of FIG. 1.

To assist in the further explanation of the preferred embodiments, FIG. 1 is a schematic illustration a system configured for autonomic buffer configuration in accordance with the present invention. The system can include a profile processor 200 coupled to a set of profiles 170 produced through monitoring the buffers 150 of a communications system 110. In this regard, the profile processor 200 can be coupled to the buffers 150 through a buffer interface 160. The buffers 150, in turn, can store data 140 in transit between client processes 130 and the communications system 110 through the communications network 120.

Notably, the communications system 110 can include an interface for sending and receiving the data 140 over the communications network 120. As such, the communications system 110 can include a transport layer configured to buffer incoming and outgoing data requests and responses from and to client processes 130, respectively, over from the communications network 120. For instance, the communications system 110 can manage the buffering of incoming requests received from the client processes 130 intended for server processes (not shown) coupled to the communications system 110. Similarly, the communications system 110 can manage the buffering of outgoing responses to requests from the client processes 130. Hence, it will be understood that the buffers 150 can include both kernel-level buffers and application-level buffers depending upon the specific usage of the buffers 150 and whether the usage occurs closer to the transport layer of the communications system 110 or the applications layer.

The profile processor 200 can monitor the buffers 150 through a buffer interface 160 outside of the processing of the data 140 in the buffers 150. Thus, it will be recognized by the skilled artisan that the monitoring is an "out of band" process. During the monitoring phase, the profile processor 200 can observe the size of data 140 flowing through the buffers 150 over an established interval. The profile processor 200 further can observe the size of data 140 flowing through individual connections supported by the buffers 150. The duration of any delays between consecutive I/O operations can yet further can be observed, as can any pattern of data 140, such as a particular ordering of data 140 passing through the buffers 150. Finally, the amount of data 140 passed between the application and kernel layers of the communications system 110 can be observed. All or any part of the observed data can be persisted in the profiles 170.

Once the profiles 170 have been created based upon the observations of the profile processor 200, the profile processor 200 can compute an optimal size for the buffers 150. The optimal size can be based upon a computation of a buffer size required to accommodate a selected success rate for data 140 flowing through the buffers 150. Once the buffer size has been computed for the buffers 150, the profile processor 200 can dynamically resize the buffers 150 through the buffer interface 160. In this way, the buffers 150 will have been optimally sized to subsequently store data 140 without requiring manual intervention and without having to interject the reconfiguration within the process of operating the buffers 150 themselves.

Figure 2:
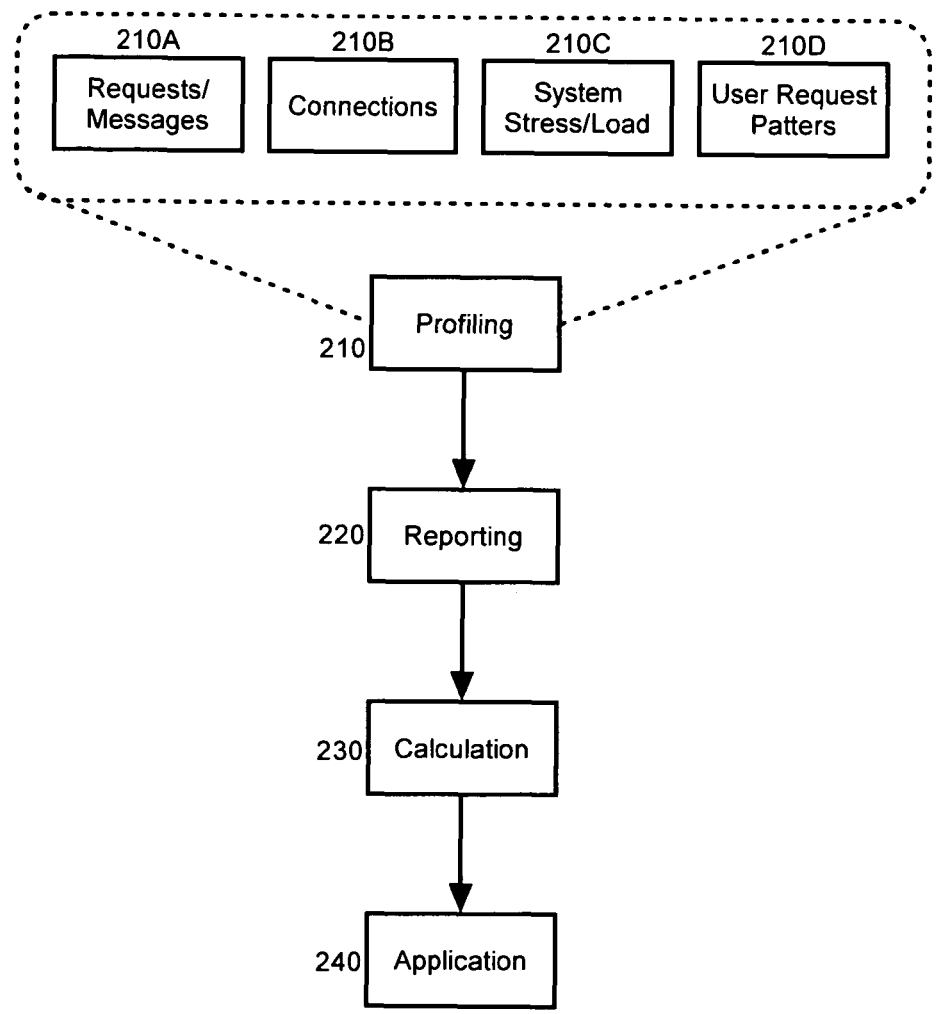

In yet further illustration of the operation of an autonomic buffer configuration system, FIG. 2 is a flow chart illustrating a process for autonomically configuring a buffer in the system of FIG. 1. The process can begin in step 210 in which the operation of the buffer can be profiled for subsequent analysis. The profiling can include one or more monitoring activities reflected in blocks 210A, 210B, 210C and 210D. In block 210A, a statistical analysis can be performed on the size of requests for an interval of time for the entire communications system. In this regard, it can be recorded when the size of a request exceeds the size of the buffer during the monitored interval.

To provide a more granular view of the communication system, in block 2108 the utilization of the buffer for each communicative connection further can be monitored. Specifically, each newly opened connection in the communications system can be monitored for its usage of an assigned buffer. During the course of communications through the connection, the usage of the buffer can be compared to the required usage of the buffer to ensure the continuity of the connection. By comparison, in block 210C the duration of delays between consecutive I/O operations can be measured as can the amount of data based to the application level from the transport level. Finally, the ordering of data and the size of the data flowing through the buffer can be recorded. Optionally, the amount of data passed between the kernel layer and the application can be recorded as well (not shown).

Once a profile has been produced in the profiling step 210, in step 220 the profile can be reported for analysis. The analysis can include a calculation step 230 in which an optimal buffer size can be determined for the communications system based upon its respective profile. For instance, where the profile indicates that ninety-seven (97) percent of data flowing through an eight (8) kilobyte (KB) buffer are Web pages having a size which does not exceed fifteen (15) KBs, the calculation can conclude that the buffer ought to be increased to 15 KB. Conversely, where the profile indicates that 97 percent of data flowing through an 8 KB buffer are Web pages having a size which does note exceed three (3) KB, the calculation can conclude that the buffer ought to be resized to 3 KB. In any case, once the optimal buffer size has been computed, in block 240 the buffer can be resized accordingly in real-time.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A profile processor device disposed within an autonomic buffer configuration system comprising:
   a performance monitor arranged to monitor data flowing through at least one buffer in a communications system;
   a reporting tool configured to generate at least one buffer profile based upon monitored information produced by said performance monitor;
   a buffer size calculator programmed to compute an optimal buffer size for said at least one buffer based upon said at least one buffer profile; and,
   a buffer resizing component coupled to said at least one buffer and programmed to dynamically resize said at least one buffer to said optimal buffer size without re-initializing said buffer.

2. The profile processor device of claim 1, wherein said at least one buffer is selected from the group consisting of a profile processor application-level buffer and a kernel-level buffer.

3. The profile processor device of claim 1, wherein said data comprises at least one of requests and responses to said requests.

4. The profile processor device of claim 1, wherein said communications system is disposed within one of a Web server and an applications server.

5. The profile processor device of claim 2, wherein said performance monitor comprises a configuration for performing an analysis of an amount of data passed between said application-layer buffer and said kernel-layer buffer.

6. The profile processor device of claim 3, wherein said performance monitor comprises a configuration for performing at least one of (1) a statistical analysis of request sizes for an interval of time for said communications system, (2) a statistical analysis of request sizes for an interval of time for individual connections in said communications system, (3) a statistical analysis of inserting delay durations of varying lengths between consecutive input/output operations in said communications system, and (4) a statistical analysis of patterns of requests and an ordering of said requests in said patterns.

7. The profile processor device of claim 1, wherein said monitored information is weighted in said at least one buffer profile.

8. The profile processor device of claim 1, further comprising a profile aggregator configured to combine individual buffer profiles to produce a single profile for use by said calculator in computing an optimal buffer size.

* * * * *